Dec. 22, 1953   J. J. McANDREWS   2,663,683
APPARATUS FOR EVAPORATING LIQUIDS
Filed May 2, 1952   3 Sheets-Sheet 3
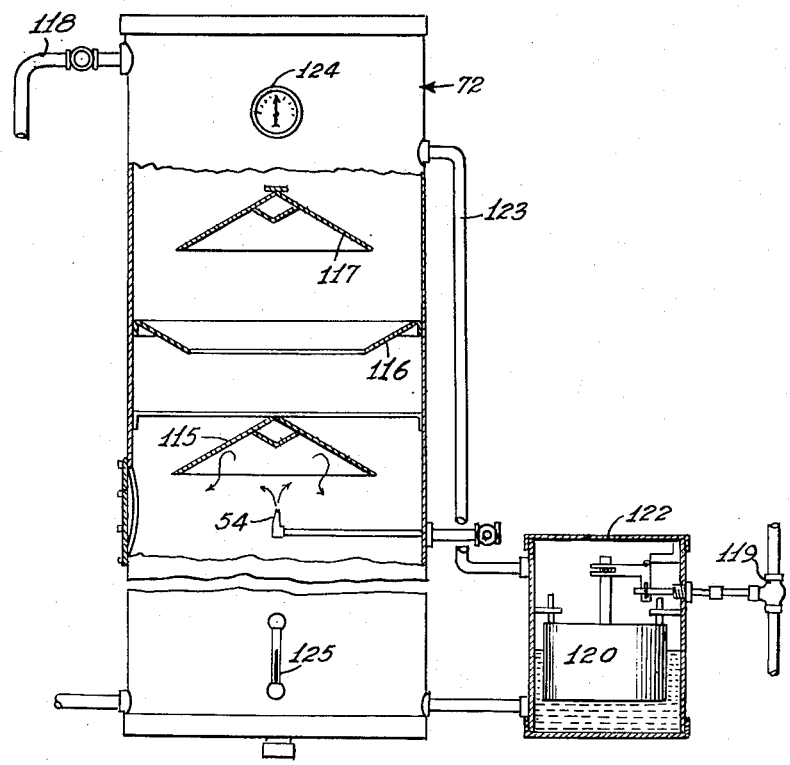

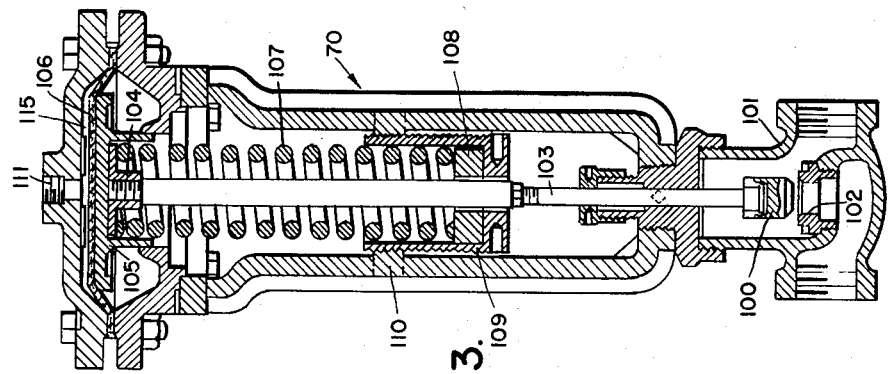

Patented Dec. 22, 1953

2,663,683

UNITED STATES PATENT OFFICE 2,663,683

APPARATUS FOR EVAPORATING LIQUIDS

John J. McAndrews, Hempstead, N. Y.

Application May 2, 1952, Serial No. 285,666

2 Claims. (Cl. 202—180)

This invention relates to an apparatus for evaporating liquids, and particularly to improvements in water evaporating systems.

This application is a continuation-in-part of my application Serial No. 171,343, now abandoned, filed June 30, 1950.

It is an object of this invention to provide an evaporating system for water, such as sea water, which will provide water of a very high degree of purity.

It is a further object of this invention to devise an apparatus for evaporating water which can employ high pressures and temperatures. As a result of these high pressures and temperatures, the system which I have devised operates in a very efficient manner.

It is still another object of this invention to provide a water evaporating system which is compact. My system can be accommodated in considerably less space than any of the previous evaporating systems intended for the same purpose. This is particularly advantageous on shipboard where space limitations are of great importance.

Still another object of this invention is to provide a water evaporating system in which scaling of the various components does not occur. In conventional evaporating units, and particularly in those units used on ship-board, the formation of scale within the pipes and other components is a major problem. Conventional equipment must be frequently dismantled in order to remove the scale which builds up to a point where the efficiency of the evaporating unit is considerably lessened. Such dismantling not only places the units out of action for a period of time, but is expensive.

Another object of my invention is to provide a means for utilizing waste heat in the stacks of a vessel for evaporating water.

Other objects and advantages of my invention will be apparent from the following description and the accompanying drawing, in which:

Figure 2 is a sectional view of a thermostatically controlled valve used in my invention.

Figure 3 is a sectional view of a pressure controlled valve used in my invention.

Figure 4 is a side elevational view partly in section of an evaporation chamber used in my invention.

Similar reference characters represent similar parts in the several figures.

Figure 1:
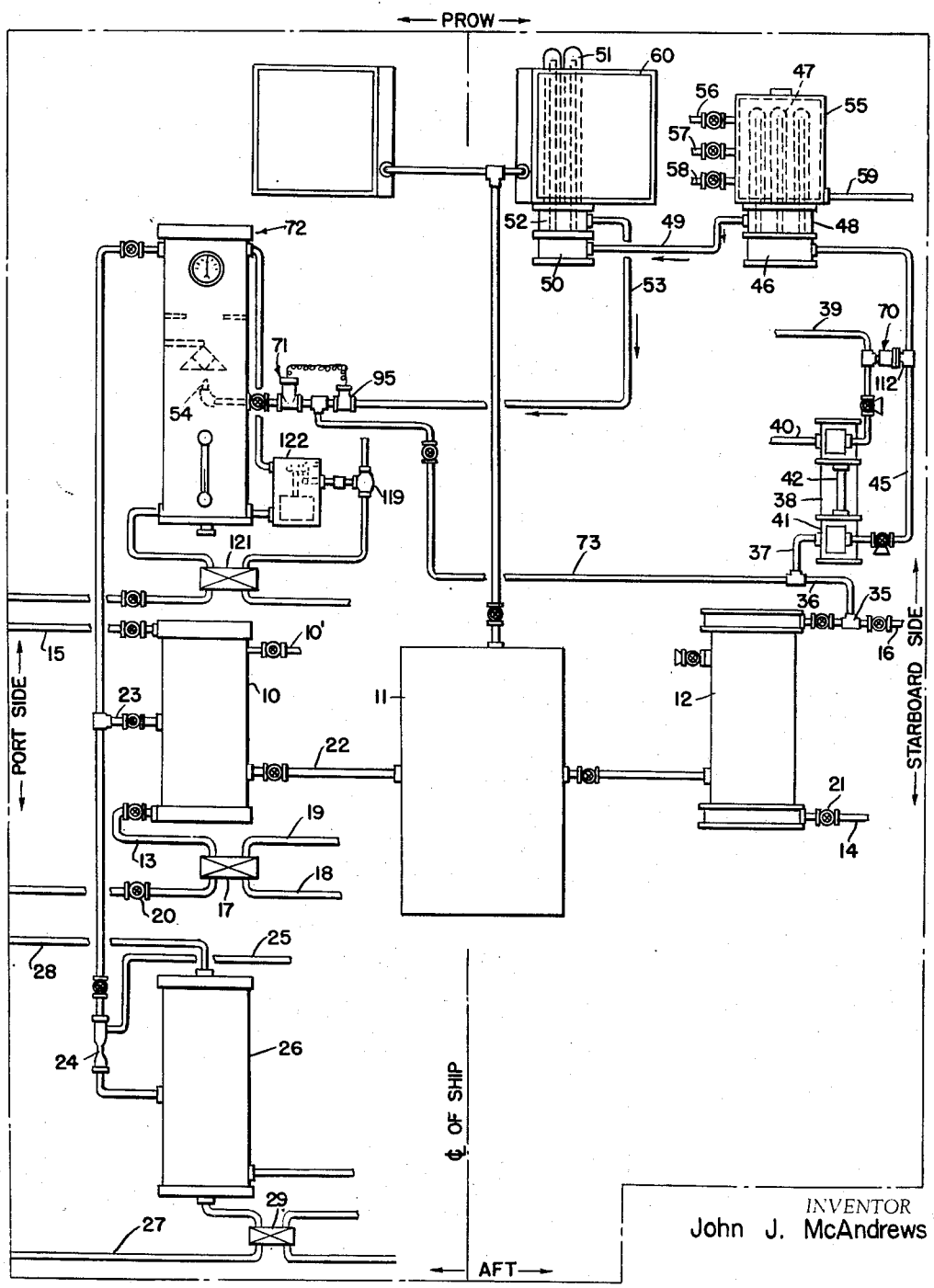
Figure 1 is a schematic view of a system embodying my invention.

The means of requiring potable water is a necessity on ocean-going vessels. It is also necessary that a means for obtaining large quantities of water suitable for boilers, washing, etc. be provided. The present evaporating systems employed on ship-board are cumbersome in nature. Many evaporators comprise means for evaporating large bodies of water by passing the steam through coils. Due to the operating temperatures and pressures employed, these evaporators operate at a low efficiency. As a result, a considerable number of evaporators must be placed on each ship. This is particularly true on the larger vessels. It is common practice to utilize two stages of evaporation when it is desirable to obtain potable water. In the second stage the water obtained from the usual type of evaporator employed is not heated sufficiently to meet the requirements of the health regulations issued by the U. S. Public Health Service.

In my invention I utilize high pressures and temperatures and as a result obtain a high degree of efficiency and all water evaporated conforms to U. S. Public Health Service regulations. My invention also is so devised that I have overcome the scaling which occurs in the presently known systems, and can produce large quantities of water with very compact and simple equipment. A further advantage of my invention is that it is automatic in operation. No attendance is needed once the controls are set.

In Figure 1 I show the principal components of my evaporation system, as employed with a propulsion system embodying exhaust steam condensers. Reference character 10 indicates the main condenser of a main engine 11 and reference character 12 indicates an auxiliary condenser. As is common practice, these condensers are provided with water inlet conduits 13 and 14 and over-board discharge conduits 15 and 16. Pumps, such as pump 17, are normally employed, and these pumps have steam inlet lines 18 and exhaust lines 19. Various valves, such as 20 and 21, are provided, as is the usual practice.

In the common manner of operating such equipment as is shown, steam from the main engine 11 goes through conduit 22 to the condenser 10, where it is cooled by the water coming into the inlet conduit 13.

The condensed water leaves the condenser 10 and is returned to the boilers through conduit 10'. Condensers, such as 10 and 12, operate under a vacuum and when it is desired to direct water obtained from my evaporation system into the boiler to make up for losses, condensed water from my invention enters condenser 10 through conduit 23. The normal vacuum on the condensers serves to keep proper vacuum in the flash evaporator employed with my invention and hereinafter described.

When the engines are not running or when water is desired for other than boiler make-up I employ a steam jet 24 for producing the required vacuum in any flash evaporator. Steam is admitted to the jet through conduit 25. The jet forces steam from the flash evaporator into distiller condenser 26. The distiller condenser has an inlet conduit 27 and over-board discharge 28 through which cooling water is forced through the condenser by pump 29 and discharged therefrom.

In my invention I can utilize water taken from the sea or other sources, or water that is already heated by virtue of having passed through units, such as condensers, for producing potable water. At 35 I show a connection to the discharge conduit 16 from the auxiliary condenser 12. Conduits 36 and 37 lead discharged water from condenser 12 to a pump 38, which as shown, may be a double acting steam pump having a steam inlet 39 and a steam outlet 40.

The pump proper 41 is, of course, driven by the connecting rod or piston rod 42. It is understood that a different type of pump may be used. From the pump the water is pumped through conduit 45 to a header 46, from which the water flows through heating tubes 47 into header 48. Conduit 49 then leads water to a header 50 through heating tubes 51, header 52 and unit conduit 53. Conduit 53 directs the water to an evaporating nozzle 54. Heating tubes 47 are enclosed in a primary heater 55 which may be provided with three steam admission conduits 56, 57 and 58, and an exhaust conduit 59. Conduit 56 may lead to connection with exhaust steam from an engine or other component. Conduit 57 may be employed to connect with a bleed leading from the main engine and conduit 58 may be connected directly to a boiler 60. The heating tubes 51 are placed in the stack leading from the boiler, and utilize heat that would normally pass up the stack and into the atmosphere.

An important part of my invention is the use of a pressure controlled valve 70 which is interposed in the steam admission line 39, and a temperature controlled valve 71 which is placed in the conduit 53 immediately adjacent a flash evaporator 72 in which the nozzle 54 is mounted.

I also provide a re-circulating line 73, through which water can be re-circulated through the heating tubes 47 and 51. Valves 70 and 71 are shown in detail in Figures 3 and 2, respectively, and the evaporating chamber 72 is shown in detail in Figure 4.

Referring now to Figure 2, the valve body 75 of valve 71 is inserted in conduit 53. Valves 76 and 77 seat on valve seats 78 and 79. Valve stem 80 extends upwardly into valve operating chamber 81. A takeup spring 82 is supported on the upper end of valve stem 80 by means of ledge 83. A takeup spring chamber 84 has a lip 85 which engages the bottom of the ledge 83. At its upper end the chamber 84 is threadingly engaged with a takeup cap 86. At its upper end takeup cap 86 seats against a cup-shaped element 87 attached to the bellows 88. Upper spring washer 89 is held against the takeup cap 86 by an adjusting spring 90. Spring 90 in turn rests on a lower spring washer 91 and an adjusting nut 92, which threadingly engages an upstanding element of the valve housing 93. Bellows 88 is connected to a thermostatic bulb 94 which is adapted to be inserted into T-fitting 95 shown in Figure 1, by means of a threaded flange 96 suitably attached thereto. In this manner the bulb 94 is immersed in the fluid contained in conduit 53. Bulb 94 is connected to bellows 88 by a hollow conduit tube 97, which is wrapped in any suitable insulation material 98. Bulb 94, tube 97 and bellows 88 are filled with a suitable thermo-responsive fluid.

It is seen that the fluid pressure of the thermo-responsive fluid varies with the temperature of the water in the conduit 53. By means of the adjusting nut 92, the spring 90 can be adjusted so as to exert a particular pressure against the bellows 88. When the fluid pressure in the bellows rises beyond the setting of the spring 90, due to fluid being heated by the water in conduit 53, valves 76 and 77 will open and permit the flow of water to the nozzle 54.

Figure 3 shows the pressure-controlled valve mechanism 70. Valve chamber 101 is inserted in the steam inlet line 39. Valve 100 is adapted to seat against valve seat 102. Valve stem 103 is threadingly connected to spring carrier 104, which in turn seats against a saucer-like element 105. Element 105 abuts a flexible diaphragm 106. Spring 107 abuts at one end against spring carrier 104 and at the other end against a spacer 108 seated on adjusting nut 109. The adjusting nut threadingly engages an insert 110 forming a part of the valve assembly 70. It is seen that the adjusting nut 110 can be moved so as to increase the pressure against the diaphragm 106. Threaded opening 111 can be connected to T 112 shown in Figure 1 in any suitable manner. It is seen that the diaphragm chamber 113 is thus exposed to the water in conduit 45.

Valve 100 is normally open to admit steam to the pump. However, when the pressure in conduit 45 rises above the setting of the spring 107, the valve 100 will move downwardly and throttle the steam being admitted to the pump. Valve 70 thus is a throttling valve which is employed to maintain a pressure in the line 45 in accordance with the setting of the spring 107. Valve 71 maintains a pressure in conduits 49, 53, and the heating tubes 51 and 47 sufficient to prevent evaporation of the water and resulting scaling at the high temperatures to which the water is heated. Valve 71 prevents the passage of water into the evaporating chamber 72 until the temperature is adequate to produce flash evaporation within such chamber.

In operation the pump 38 pumps the water to be purified through the heaters up to the valve 71. If the temperature has not been raised sufficiently for the pressure being supplied by the pump, the water will re-circulate through the conduit 73 until the proper temperature is obtained. When the proper temperature is reached valve 71 permits the passage of water into the evaporator. Any tendency of the pressure to drop in the line is compensated by the action of the valve 70. As the pressure starts to drop, the valve 100 will open sufficiently to introduce additional steam to the pump 38, as required. The pump will thus speed up and maintain the proper pressure. It is through the use of the pressure and temperature controlled valves that it is possible to have an evaporating system of high efficiency. Such valves, together with the pump 38 permit the use of a high degree of heat for evaporating purposes without the formation of scale in the conduits and other elements.

Figure 4 illustrates the evaporating chamber 72. As shown, a baffle 115 is mounted directly above the diffusing nozzle 54, and additional baffles 116 and 117 are provided to entrap particles of water. While I have shown the nozzle 54 pointing in an upwardly extending position, it can be reversed to discharge the water downwardly against diffusing plates. In either event the steam will rise to the top. The evaporated water passes off through the conduit 118 into the distillate condenser 26. Jet 24 maintains an adequate vacuum in the evaporating chamber 72. The steam which comes off through the conduit 118 may be directed into the main condenser 10, and used as feed water. The rado jet 24 may, of course, be replaced by other means of maintaining the proper vacuum.

Figure 4 also shows a valve 119 which is controlled by a float 120. As the bottom of the evaporating chamber 72 becomes filled with water the float 120 rises. When the float has risen sufficiently valve 119 is opened and steam is admitted to pump 121, shown in Fig. 1. Pump 121 pumps the waste water out of the evaporating chamber until the float 120 drops sufficiently to shut valve 119. The float chamber 122 is a sealed chamber as is the evaporating chamber 72. The conduit 123 connects the float chamber with the upper portion of the evaporation chamber. In this way vacuum is maintained in the float chamber to insure accurate operation and to insure that the same conditions exist in the float chamber as in the evaporation chamber. As the evaporation takes place in chamber 72, water not converted to steam and solids will fall to the bottom and eventually be pumped off by pump 121. A vacuum gauge 124 and a water gauge 125 may be provided for the evaporation chamber 72. A water pressure gauge may be provided on conduit line 45.

It is obvious that the system can be regulated to operate it in any desired degrees of temperature and pressure, and that different types of pressure and temperature controlled valves than those shown, can be utilized. Also different heating and evaporating means may be provided, although the evaporating means shown is particularly suitable for maintaining a high efficiency in the system. The temperature controlled valve shown is adjustable to operate in the range from zero degrees to a thousand degrees F. and more, and has a lag of about 5°. The valve 70 is adjustable to most any pressure desired, depending upon the spring used.

Steam being let off from auxiliaries or exhausts into conduit 56 might be expected to be about 26 pounds pressure absolute. Such steam has a temperature of about 242° F. The steam being let off from the main engine 11 into conduit 57 might be expected to have a pressure of 70 pounds absolute and a temperature of about 316° F. Steam coming directly from the main boiler into conduit 58, might be at a pressure of 600 pounds absolute and a temperature of 486° F. The temperature and pressure controls should be set so that the water in the conduits 49 and 53 and the heating tubes 47 and 51 will be maintained at approximately 10° below the flash point temperature for the particular temperatures and pressures being utilized for heating.

The pressure valve 70 should be set so that the pressure of water in conduits 49 and 53, and in the other elements, is the same as that of the steam being supplied to the heater 47. Thus, for example, if steam were being admitted to the heater 55 at 26 pounds absolute pressure, having a boiling point average of 242° F. the pressure control 70 should be set so that a pressure of 26 pounds absolute would be maintained and the temperature control should be set so that water will be admitted to the evaporating chamber when the temperature reaches 232° F. Since the evaporating chamber is operating at a vacuum instant evaporation will occur. The temperatures and pressures and particular settings given above are, of course, merely illustrative. These will vary in accordance with the particular installation and circumstances. Also a different type of heating means might be employed. Ordinarily it is expected that water will enter chamber 72 at a temperature of approximately 240° and under approximately 140 pounds of pressure absolute. The valve 71, it should be noted, might be referred to as a back pressure valve, since it functions to maintain a back pressure on the water in the heating elements. Numerous valves such as those shown may be provided for by-passing, shutting down, etc.

From the foregoing description it is apparent that I can take ordinary sea water, for example, and use my new method to obtain distillate for boilers or other purposes without the formation of scale in the pipes or associated equipment. In my method of evaporation the water is heated by coming into contact with heating elements. However, no evaporation takes place until the water reaches the evaporation chamber where it is flashed into steam and solids or other contaminating material are separated and removed by a discharge pump.

The essential feature of the invention resides in the method of preventing evaporation by maintaining the water under pressure until it is flashed into steam.

Whereas I have shown my method in its preferred form as adapted to be used in connection with a steam vessel power plant, it should be realized that it may be applicable to other similar uses.

While this invention has been described in detail with respect to a present preferred form which it may assume, it is not to be limited to such details and form since many changes and modifications may be made in the invention without departing from the spirit and scope of the invention in its broadest aspects. Hence, it is desired to cover any and all forms and modifications of the invention which may come within the language or scope of any one or more of the appended claims.

I claim:

1. A non-scaling system for evaporating sea-water comprising an indirect heat exchange engine-exhaust steam condenser, a heating unit, a flash evaporator, and an indirect heat exchange distillate condenser, conduit means for introducing cold sea-water into the engine-exhaust steam condenser, further conduit means leading from the engine-exhaust steam condenser to said heating unit, for passing the sea-water from the engine-exhaust steam condenser to the heating unit, a feed water pump in said last named conduit means for placing the sea-water under super-atmospheric pressure, a pressure valve situated in said conduit means between the pump and the heating unit, further conduit means leading from the heating unit to said flash evaporator, a back pressure valve situated in said conduit means between the heating unit and the flash evaporator, the two valves coacting to maintain a constant predetermined super-atmospheric pressure throughout that part of the system situated between said valves, said flash evaporator comprising a sealed chamber maintained under sub-atmospheric pressure, said chamber having therein upper and lower downwardly and outwardly inclined centrally located conical diffusing plates, an annular downwardly and inwardly inclined baffle located between said plates and extending from the sides of said chamber, a centrally located nozzle positioned directly under said lower diffusing plate, the conduit means leading from the heating unit to the flash evaporator being in communication with said nozzle and passing the sea-water from the heating unit to the nozzle; said chamber further having a float valve controlled liquid outlet at the bottom of the chamber and a steam outlet at the top of the chamber, steam conduit means connected to the steam outlet for passing the steam to said indirect heat exchange distillate condenser, and means for maintaining said chamber and said indirect heat exchange distillate condenser under sub-atmospheric pressure.

2. A non-scaling system for evaporating sea-water comprising an indirect heat exchange engine-exhaust steam condenser, a heating unit, a flash evaporator, and an indirect heat exchange distillate condenser, conduit means for introducing cold sea-water into the engine exhust steam condenser, further conduit means leading from the the engine-exhaust steam condenser to said heating unit, for passing the sea-water from the engine-exhaust steam condenser to the heating unit, a feed water pump in said last named conduit means for placing the sea-water under super-atmospheric pressure, automatic controls for regulating said pump and the pressure of said sea water between said evaporator and said pump comprising a pump governor valve for controlling the operation of said pump, said pump governor valve being pressure controlled by the pressure in said last named conduit means, and a temperature controlled valve controlled by the temperature in said further conduit means for admitting water to said evaporator, said flash evaporator comprising a sealed chamber maintained under sub-atmospheric pressure, said chamber having therein upper and lower downwardly and outwardly inclined centrally located conical diffusing plates, an annular downwardly and inwardly inclined baffle located between said plates and extending from the sides of said chamber, a centrally located nozzle positioned directly under said lower diffusing plate, the conduit means leading from the heating unit to the flash evaporator being in communication with said nozzle and passing the sea-water from the heating unit to the nozzle; said chamber further having a float valve controlled liquid outlet at the bottom of the chamber and a steam outlet at the top of the chamber, steam conduit means connected to the steam outlet for passing the steam to said indirect heat exchange distillate condenser, and means for maintaining said chamber and said indirect heat exchange distillate condenser under sub-atmospheric pressure.

JOHN J. McANDREWS.

References Cited in the file of this patent

UNITED STATES PATENTS

| Number | Name | Date |
|---|---|---|
| 264,208 | Walker | Sept. 12, 1882 |
| 831,337 | Gale | Sept. 18, 1906 |
| 1,006,823 | Block | Oct. 24, 1911 |
| 1,666,777 | Forbes | Apr. 17, 1928 |
| 2,025,724 | Clendenin | Dec. 31, 1935 |
| 2,027,395 | McVoy | Jan. 14, 1936 |
| 2,179,833 | Sondermann | Nov. 13, 1939 |
| 2,270,609 | Smith | Jan. 20, 1942 |
| 2,358,559 | Clemens | Sept. 19, 1944 |
| 2,375,713 | Weidner | May 8, 1945 |
| 2,441,361 | Kirgan | May 11, 1948 |
| 2,471,873 | Pulley | May 31, 1949 |
| 2,501,960 | Olson | Mar. 28, 1950 |